United States Patent
Davies

(10) Patent No.: US 11,890,578 B2
(45) Date of Patent: Feb. 6, 2024

(54) DESALINATION SYSTEM AND METHOD

(71) Applicant: THE UNIVERSITY OF BIRMINGHAM, Birmingham West Midlands (GB)

(72) Inventor: Philip Andrew Davies, Solihull West Midlands (GB)

(73) Assignee: THE UNIVERSITY OF BIRMINGHAM, Birmingham West Midlands (GB)

( * ) Notice: Subject to any disclaimer, the term of this patent is extended or adjusted under 35 U.S.C. 154(b) by 597 days.

(21) Appl. No.: 17/270,227

(22) PCT Filed: May 1, 2019

(86) PCT No.: PCT/GB2019/051208
§ 371 (c)(1),
(2) Date: Feb. 22, 2021

(87) PCT Pub. No.: WO2020/039158
PCT Pub. Date: Feb. 27, 2020

(65) Prior Publication Data
US 2021/0299613 A1    Sep. 30, 2021

(30) Foreign Application Priority Data
Aug. 23, 2018  (GB) ..................................... 1813792

(51) Int. Cl.
*B01D 61/12* (2006.01)
*B01D 61/02* (2006.01)
(Continued)

(52) U.S. Cl.
CPC ........... *B01D 61/12* (2013.01); *B01D 61/025* (2013.01); *B01D 61/06* (2013.01); *B01D 61/08* (2013.01);
(Continued)

(58) Field of Classification Search
CPC ............ B01D 2311/14; B01D 2313/18; B01D 2313/243; B01D 2313/246;
(Continued)

(56) References Cited

U.S. PATENT DOCUMENTS

| 498,330 A | 5/1893 | Towle |
|---|---|---|
| 4,983,301 A | 1/1991 | Szücz et al. |

(Continued)

FOREIGN PATENT DOCUMENTS

| CN | 1486214 A | 3/2004 |
|---|---|---|
| CN | 1668872 A | 9/2005 |

(Continued)

OTHER PUBLICATIONS

International Search Report dated Jul. 12, 2019 for corresponding International Application No. PCT/GB2019/051208, dated May 1, 2019.

(Continued)

*Primary Examiner* — Terry K Cecil
(74) *Attorney, Agent, or Firm* — David D. Brush; Westman, Champlin & Koehler, P.A.

(57) ABSTRACT

A desalination system including: a partitioned container having upstream and downstream compartments divided by a movable partition, a first inlet port at an upstream end, and a second inlet port and an outlet port at the downstream end; a membrane container housing a cross-flow semipermeable membrane dividing the membrane container into saline and desalinated compartments, the saline compartment including first and second cross-flow ports, the desalinated compartment including a desalinated water outlet port; a feed pump connected to the first inlet port; a recharge pump having an inlet connected to the second cross-flow port and an outlet connected to the second inlet port; a main valve connected between the outlet port and the first cross-flow (Continued)

port; a bypass valve connecting the inlet port to the second cross-flow port and the recharge pump inlet; and a purge valve connecting the first cross-flow port and the main valve to a purge port.

20 Claims, 7 Drawing Sheets

(51) Int. Cl.
| | |
|---|---|
| *B01D 61/06* | (2006.01) |
| *B01D 61/08* | (2006.01) |
| *C02F 1/00* | (2023.01) |
| *C02F 1/44* | (2023.01) |
| *F16K 17/04* | (2006.01) |
| *F16K 17/30* | (2006.01) |
| *C02F 103/08* | (2006.01) |

(52) U.S. Cl.
CPC .............. *C02F 1/008* (2013.01); *C02F 1/441* (2013.01); *F16K 17/04* (2013.01); *F16K 17/30* (2013.01); *B01D 2311/14* (2013.01); *B01D 2313/18* (2013.01); *B01D 2313/243* (2013.01); *B01D 2313/246* (2013.01); *B01D 2315/10* (2013.01); *C02F 2103/08* (2013.01); *C02F 2201/005* (2013.01); *C02F 2209/03* (2013.01); *C02F 2303/10* (2013.01)

(58) Field of Classification Search
CPC .. B01D 2315/10; B01D 61/025; B01D 61/06; B01D 61/08; B01D 61/12; C02F 1/008; C02F 1/44; C02F 1/441; C02F 2103/08; C02F 2201/005; C02F 2209/03; C02F 2303/10; F16K 17/04; F16K 17/30; Y02A 20/131
See application file for complete search history.

(56) References Cited

U.S. PATENT DOCUMENTS

| | | |
|---|---|---|
| 10,166,510 B2 | 1/2019 | Warsinger et al. |
| 2017/0239620 A1 | 8/2017 | Warsinger et al. |
| 2018/0104648 A1 | 4/2018 | Oklejas, Jr. |

FOREIGN PATENT DOCUMENTS

| | | |
|---|---|---|
| CN | 1852758 A | 10/2006 |
| CN | 100341609 C | 10/2007 |
| CN | 105073230 A | 11/2015 |
| ES | 2396280 A1 | 2/2013 |
| KR | 20170004630 A | 1/2017 |
| WO | 2014061948 A1 | 4/2014 |
| WO | 2020039158 A1 | 2/2020 |

OTHER PUBLICATIONS

Written Opinion of the International Searching Authority dated Jul. 12, 2019 for corresponding International Application No. PCT/GB2019/051208, filed May 1, 2019.
Davies et al., "A desalination system with efficiency approaching the theoretical limits", Desalination and Water Treatment—accepted Mar. 13, 2016.
Ali et al., "Off-grid desalination for irrigation in the Jordan Valley", Presented at the plenary session on 'Water Across Borders' of 'Desalination for the Environment: Clean Water and Energy', Sep. 3-6, 2018, Athens, Greece.
First Chinese Office Action dated Aug. 1, 2022 for corresponding Chinese Application No. 201980064950.1.
Chinese Search Report dated Jul. 21, 2022 for corresponding Chinese Application No. 201980064950.1.
International Search Report dated May 4, 2022 for corresponding International Application No. PCT/GB2021/052880, filed Nov. 5, 2021.
Written Opinion of the International Searching Authority dated May 4, 2022 for corresponding International Application No. PCT/GB2021/052880, filed Nov. 5, 2021.
Great Britain Search Report under Section 17(5) dated Mar. 25, 2021 for corresponding Great Britain Application No. 2017512.1, filed Nov. 5, 2020.
1 Communication under Rule 71(3) EPC dated Aug. 16, 2022 for related European Application No. 19 723 170.7.

DESALINATION SYSTEM AND METHOD

CROSS-REFERENCE TO RELATED APPLICATIONS

This Application is a Section 371 National Stage Application of International Application No. PCT/GB2019/051208, filed May 1, 2019, the content of which is incorporated herein by reference in its entirety, and published as WO 2020/039158 on Feb. 27, 2020, in English.

FIELD OF THE INVENTION

The invention relates to a desalination system and a method of operating a desalination system.

BACKGROUND

Desalination systems have many industrial applications. One application, for example, is the separation of potable water from groundwater that is saline and therefore unfit for drinking. Other applications include the treatment of seawater and of saline effluents produced by textile factories.

In desalination applications, there frequently arises the need to maximise the recovery. The term recovery refers to the volume of freshwater produced at the output of the system as a fraction of the volume of saline water supplied at the input. A high recovery is frequently desired to maximise the useful output of the system and to minimise the required input.

SUMMARY OF THE INVENTION

In accordance with a first aspect of the invention there is provided a desalination system comprising:
- a partitioned container housing a movable partition partitioning the container into an upstream compartment and a downstream compartment each of variable volume, the partitioned container having a first inlet port at an upstream end of the container, a second inlet port at a downstream end of the container and an outlet port at the downstream end of the container;
- a membrane container housing a cross-flow semipermeable membrane dividing the membrane container into a saline compartment and a desalinated compartment, the saline compartment comprising first and second cross-flow ports, the desalinated compartment comprising a desalinated water outlet port;
- a feed pump connected to feed a supply of saline water to the first inlet port;
- a recharge pump having an inlet connected to the second cross-flow port and an outlet connected to the second inlet port to feed saline water into the downstream compartment;
- a main valve connected between the outlet port and the first cross-flow port;
- a bypass valve connected on one side to the inlet port and on another side to the second cross-flow port and the inlet of the recharge pump; and
- a purge valve connected on one side to the first cross-flow port and the main valve and on another side to a purge port.

The invention described here is particularly useful for achieving high recovery and output of fresh/desalinated water without incurring an excessive energy penalty.

The desalination system may further comprise a controller connected and configured to operate the desalination system, the controller configured to:
- in a first pressurisation stage, close the bypass valve and purge valve, open the main valve and operate the feed pump to provide a supply of saline water to the upstream compartment of the partitioned container, causing the partition to move and thereby flowing saline water from the downstream compartment into the saline compartment of the membrane container, thereby causing desalinated water to exit from the desalinated compartment of the membrane container via the desalinated water outlet port; and
- in a second recharge stage, open the bypass valve and purge valve, close the main valve and operate the recharge pump and feed pump to feed saline water to the second inlet of the partitioned container and into the saline compartment of the membrane container via the second cross-flow port to cause saline water to flow out through the purge port via the first cross-flow port.

In the first pressurisation stage, the controller may be configured to operate the recharge pump to feed saline water from the saline compartment to the second inlet of the partitioned container.

The controller may be configured to repeat the pressurisation and recharge stages.

The desalination system may further comprise a first sensor arranged to provide a signal to detect when the moveable partition has, in the recharge stage, reached the upstream end of the partitioned container, the controller configured to end the recharge stage upon detecting the signal from the first sensor.

The desalination system may further comprise a second sensor arranged to provide a signal to detect when the moveable partition has, in the pressurisation stage, reached the downstream end of the partitioned container, the controller configured to end the pressurisation stage upon detecting the signal from the second sensor.

The partitioned container may be a cylindrical vessel and the moveable partition may be a piston slidably mounted within the cylindrical vessel.

The membrane container may be a cylindrical vessel.

Where the partitioned container is a first partitioned container, and the membrane container is a first membrane container, the desalination system may further comprise:
- one or more further partitioned containers, each housing a movable partition partitioning the container into an upstream compartment and a downstream compartment each of variable volume, each further partitioned container having a first inlet port at an upstream end of the container, a second inlet port at a downstream end of the container and an outlet port at the downstream end of the container;
- one or more further membrane containers, each housing a cross-flow semipermeable membrane dividing the membrane container into a saline compartment and a desalinated water compartment, the saline compartment comprising first and second cross-flow ports, the desalinated water compartment comprising a desalinated water outlet port,
- wherein the feed pump is connected to feed the supply of saline water to the first inlet port of each partitioned container, the recharge pump is connected between the second cross-flow port of each membrane container and the second inlet port of each partitioned container to feed saline water into the downstream compartment of each container, the main valve is connected between the outlet port of each partitioned container and the first cross-flow port of each membrane container, the bypass valve is connected on the one side to the inlet port of each partitioned container and on the other side to the second cross-flow port of each membrane container, and the purge valve is connected on the one side to the first cross-flow port of each membrane container.

The semipermeable membrane may be of reverse osmosis type.

The controller may be configured to control operation of the main valve, the bypass valve and the purge valve electrically. In other arrangements, the controller may be configure to control operation of the purge valve electrically and wherein the main valve and bypass valve are actuated between an open position and a closed position by a level of water pressure within the system.

The main valve may be configured to open when the level of water pressure within the system is above a threshold pressure level and the bypass valve may be configured to open when the level of water pressure is below the threshold pressure level.

In some embodiments the main valve may comprise:
a housing having an inlet and an outlet;
a plunger slidably mounted to the housing and having a sealing surface arranged to seal against an internal surface of the housing to prevent flow between the inlet and outlet; and
a biasing element arranged to bias the sealing surface away from the internal surface of the housing to maintain a flow path between the inlet and outlet when the level of water pressure within the main valve is less than the threshold pressure level and to close the flow path when the level of water pressure within the main valve is greater than the threshold pressure level.

In some embodiments the bypass valve may comprise:
a housing having an inlet and an outlet;
a plunger slidably mounted to the housing and having a sealing surface arranged to seal against an internal surface of the housing to prevent flow between the inlet and outlet; and
a biasing element arranged to bias the sealing surface against the internal surface of the housing to close a flow path between the inlet and outlet when the level of water pressure within the bypass valve is less than the threshold pressure level and to open the flow path when the level of water pressure within the bypass valve is greater than the threshold pressure level.

The threshold pressure level may be around 1 bar gauge, i.e. a 1 bar difference between the level of water pressure in the system and an external atmospheric pressure.

In accordance with a second aspect there is provided a method of operating a desalination system, the desalination system comprising:
a partitioned container housing a movable partition partitioning the container into an upstream compartment and a downstream compartment each of variable volume, the partitioned container having a first inlet port at an upstream end of the container, a second inlet port at a downstream end of the container and an outlet port at the downstream end of the container;
a membrane container housing a cross-flow semipermeable membrane dividing the membrane container into a saline compartment and a desalinated water compartment, the saline compartment comprising first and second cross-flow ports, the desalinated water compartment comprising a desalinated water outlet port;
a feed pump connected to feed a supply of saline water to the first inlet port;
a recharge pump connected between the second cross-flow port and the second inlet port to feed saline water into the downstream compartment;
a main valve connected between the outlet port and the first cross-flow port;
a bypass valve connected on one side to the inlet port and on another side to the second cross-flow port and the recharge pump; and
a purge valve connected on one side to the first cross-flow port and the main valve and on another side to a purge port,
the method comprising:
in a first pressurisation stage, closing the bypass valve and purge valve, opening the main valve and operating the feed pump to provide a supply of saline water to the upstream compartment of the partitioned container, causing the partition to move and thereby flowing saline water from the downstream compartment into the saline compartment of the membrane container, thereby causing desalinated water to exit from the desalinated water compartment of the membrane container via the desalinated water outlet port; and
in a second recharge stage, opening the bypass valve and purge valve, closing the main valve and operating the recharge pump and feed pump to feed saline water to the second inlet of the partitioned container, into the saline compartment of the membrane container via the second cross-flow port and out through the purge port via the first cross-flow port.

The first pressurisation stage may comprise operating the recharge pump to feed saline water from the saline compartment to the second inlet of the partitioned container.

The method may comprise repeating the pressurisation and recharge stages.

The method may comprise detecting a signal from a first sensor when the moveable partition has, in the recharge stage, reached the upstream end of the partitioned container, and ending the recharge stage upon detecting the signal from the first sensor.

The method may comprise comprising detecting a signal from a second sensor when the moveable partition has, in the pressurisation stage, reached the downstream end of the partitioned container, and ending the pressurisation stage upon detecting the signal from the second sensor.

Other features of the first aspect may also be applied to the method according to the second aspect.

DETAILED DESCRIPTION

The invention is described in further detail below by way of example and with reference to the accompanying drawings, in which.

One common example type of desalination system is known as a continuous flow system, in which saline water is pumped under pressure such that it flows tangentially to the surface of a semipermeable membrane. At the point where the saline water is collected and diverted away from the membrane, its concentration is much increased. Corresponding to this high concentration, a high osmotic pressure results, and a high operating pressure is required. This pressure determines the power consumption of the feed pump according to the well-known relation:

Power=volumetric flow rate of water supplied×operating pressure

Accordingly, the high operating pressure results in increased power and thus high electrical energy consumption by the feed pump. Such high energy consumption is undesirable because it is costly for the operation of the desalination system and may be harmful for the environment.

A second example is known as a semi-batch desalination system, as for example described in U.S. Pat. No. 4,983,301. In this system, the pressure is carefully varied in time so that only the requisite pressure is supplied to drive the water through the membrane at each instant. Nevertheless, a drawback of the semi-batch system is the mixing of incoming saline water with more concentrated saline water already contained in the system, which results in an inefficient and unnecessary use of energy.

A third example is the batch desalination system, as described in reference Davies et al., in "A desalination system with efficiency approaching the theoretical limits", Desalination and Water Treatment, 57 (2016) 23206-23216. This system is designed to avoid the aforementioned problem of mixing. Nonetheless, the existing batch desalination system has a limited daily output associated with its manner of operation. Its operation requires three stages: (i) a pressurisation stage; (ii) a purge stage; and (iii) a refill stage. Useful output, however, occurs during only the first of these stages. Pauses in output throughout the second and third stages reduce the daily output of the system.

Figure 1:
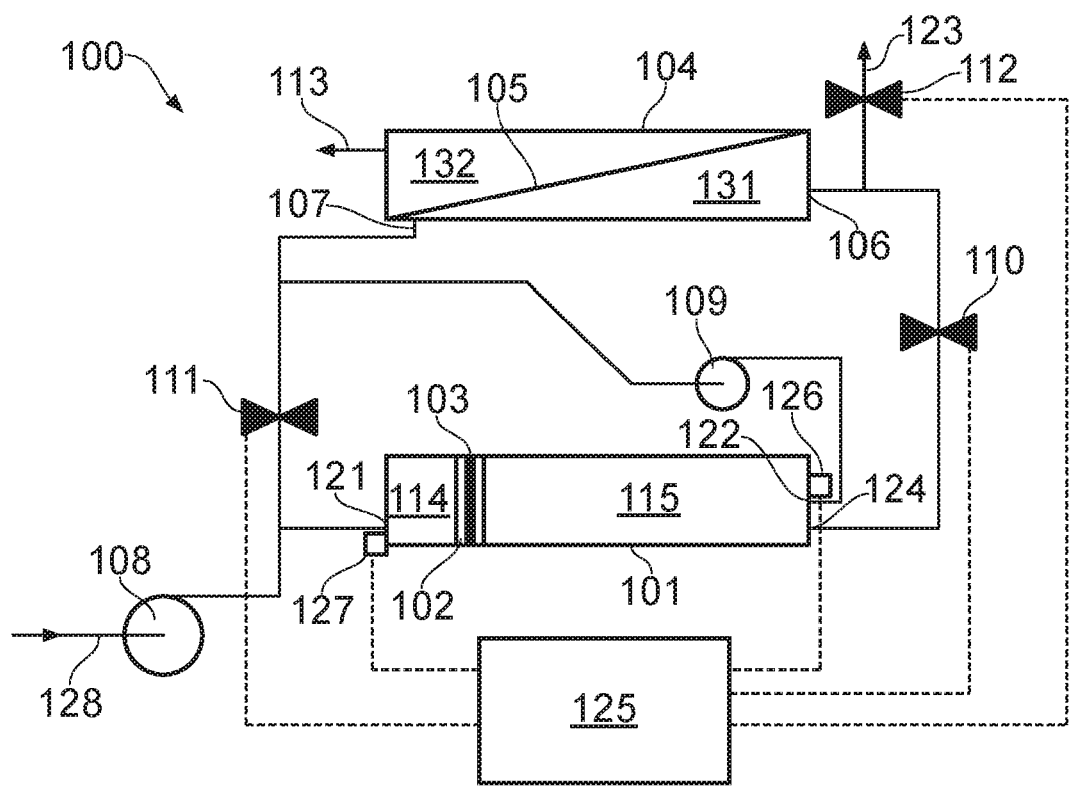
FIG. 1 is a schematic diagram of an example desalination system.

According to the invention described herein, there is provided a desalination system that allows for a batch method of desalination that is cyclic and requires only two stages of operation, namely: (i) a pressurisation stage and (ii) a purge-refill stage. The system, as illustrated in FIG. 1, comprises a first partitioned container 101 and a second membrane container 104, whereby the partitioned container 101 is divided by a mobile partition or piston 102 into an upstream compartment 114 and a downstream compartment 115. A supply of pressurised saline water is provided to the upstream compartment 114 by a first feed pump 108, which causes a volume of the upstream compartment 114 (which may be initially at zero) to increase gradually such that the partition 102 moves, displacing saline water from the downstream compartment 115 and into the membrane container 104, thus causing desalinated water to permeate through a semipermeable membrane 105 extending across the membrane container 104. The membrane 105 is illustrated schematically in FIG. 1 as extending diagonally across the membrane container 104, although in practice the geometry of the membrane may take various forms, such as a spiral wound or hollow fibre geometry to increase the available surface area of the membrane 105. When the partition 102 reaches the end of its stroke, it is returned to its initial position by a second low-pressure recharge pump 109 that refills the downstream compartment 115 while a bypass valve 111 allows feed water provided by the first pump 108 to purge the membrane container 104. The invention thus allows the non-productive period of purge and refill to be minimised by carrying out purge and refill simultaneously. The two stages of operation can repeat continuously and indefinitely in a cyclic manner.

In some examples the first and/or second containers 101, 104 can be divided into multiple vessels connected in parallel, to allow the desalination system 100 to provide a larger output through parallel operation of readily constructed smaller vessels.

Advantages relating to the invention include:
1. Minimum energy consumption during operation
2. High recovery of freshwater from saline water
3. Large daily output of desalinated water
4. Simplicity in design by minimising the number of valves required.

FIG. 1 shows an example desalination system 100, in which a partitioned container 101 provides a supply of saline water to a membrane container or vessel 104 containing a semipermeable membrane 105 to provide a supply of desalinated water via an outlet port 113. The semipermeable membrane 105 divides the membrane container 104 into a saline compartment 131 and a desalinated compartment 132. The partitioned container is in this example a cylindrical vessel 101, housing a piston 102, the piston 102 being slidably mounted within the cylindrical vessel 101. The vessel 101 may be made from glass-reinforced plastic, stainless steel or some other material resistant to pressure and to corrosion by saline water. The internal diameter of the vessel 101 may typically be four inches (approximately 10.2 cm). The piston 102 is machined to a diameter just less than four inches, enabling it to slide freely inside the cylindrical vessel 101. To prevent water from leaking between the compartments either side of the piston, the piston may be fitted with an O-ring seal 103. Alternatively the piston 102 may be machined to a sufficiently close tolerance to prevent significant leakage, and therefore without need for any seal.

The vessel 104 containing the membrane 105 may be in the form of a second cylindrical vessel housing a semipermeable membrane element 105 of a type that allows a cross flow to occur, as it is important to sweep concentrated saline solution from the surface of the membrane 105. First and second cross-flow ports 106 and 107 allow the cross flow to respectively enter and leave the vessel 104 in both directions, i.e. flowing in through the second cross-flow port 107 and out through the first cross-flow port 106, and vice versa. The membrane element 105 used may be of a spiral-wound reverse osmosis type, such as is commonly used in the desalination industry. Hollow-fibre or flat-sheet reverse osmosis membranes may also be used.

FIG. 1 shows also a first high-pressure feed pump 108 and a second low-pressure recharge pump 109. The first pump 108 provides a supply of saline water to a first inlet 121 of the cylindrical vessel 101. A bypass valve 111 connected between the first pump 108 and the second cross-flow port 107 allows, when opened, saline water from the feed pump 108 to bypass the cylindrical vessel 101 and flow into the saline compartment 131 of the membrane container 104 via the second cross-flow port 107 and to the recharge pump 109 to a second inlet 122 located at a downstream opposing end of the cylindrical vessel 101 to the first inlet 121. A purge valve 112 connected between the first cross-flow port 106 and a purge outlet 123 allows, when opened, concentrated saline water from the saline compartment 131 of the membrane container 104 to flow from the first cross-flow port 106 to the purge outlet 123. A main valve 110 connected between the first cross-flow port 106 and an outlet port 124 of the partitioned container 101 allows, when opened, saline water to flow from the outlet 124 to the first cross-flow port 106 of the membrane container 104. Valves 110, 111, 112 may be solenoid valves. To minimise the electrical power consumption in actuating the valves, the main valve 110 may be of normally-open type, whereas the bypass valve 111 and purge valve 112 may be of normally-closed type. The valves 110, 111, 112 may be motorised or pneumatically actuated, or may in some cases, in particular for the bypass and main valves 111, 110, be pressure actuated, as described in more detail below.

An electrical control unit or controller 125 is connected and configured to operate the valves 110, 111, 112 in response to sensors 126, 127 arranged to detect the position of the piston 102. A first sensor 126 may be provided at the second inlet 122 to detect when the piston 102 has moved back to the starting position, i.e. the upstream end towards the first inlet 121 end of the vessel 101. A second sensor 127 may be provided at the inlet 121 to detect when the piston 102 has moved to the downstream end of the vessel 101. The sensors 126, 127 may be pressure or flow sensors. For a pressure sensor, a pressure rise in the upstream or downstream compartments 114, 115 will result when the piston 102 reaches either end of the vessel 101, which can be detected by the relevant sensor 126, 127. A pressure difference between sensors 126, 127 positioned at or near the outlet 124 and inlet 127 respectively may be used to detect when the piston 102 has reached either end of the vessel 101. For a flow sensor, a reduction in flow rate will result when the piston 102 reaches either end of the vessel 101. The first sensor 126 may for example be a pressure sensor, as the pressure available from the first pump 108 is larger. The second sensor 127 may be a flow sensor, since the pressure variation will be less when the piston 102 has returned to the upstream end of the vessel 101. In an alternative arrangement, the sensors 126, 127 may be proximity sensors, configured to provide a signal when the piston 102 is in proximity of the sensor, thereby detecting when the piston 102 is at the upstream or downstream end of the partitioned container 101.

The various components of the desalination system 100 may be connected by pressure- and corrosion-resistant pipes, as indicated by solid lines in FIG. 1. These pipes are typically constructed of polyvinyl chloride or of stainless steel and connected by screw threads or flanges, using techniques that will be well known to those skilled in the art of designing and constructing desalination system.

Saline feed water enters the system at the inlet 128 of the feed pump 108, and is separated into desalinated water that leaves via the permeate port 113, while concentrated saline water leaves via the purge valve 112 and purge port 123. As mentioned above, the method of operation by which this separation is achieved comprises just two stages: pressurisation and purge-refill, as explained below with reference to FIGS. 2 and 3 respectively. In these two figures, pipes carrying a flow of water are indicated by solid lines while those carrying no flow are indicated by broken lines. Flow is switched on and off by the respective solenoid valves 110, 111, 112. Closed positions of the valves 110, 111, 112 are indicated by solid shading, whereas open positions are indicated by valves drawn in outline without shading.

Figure 2:
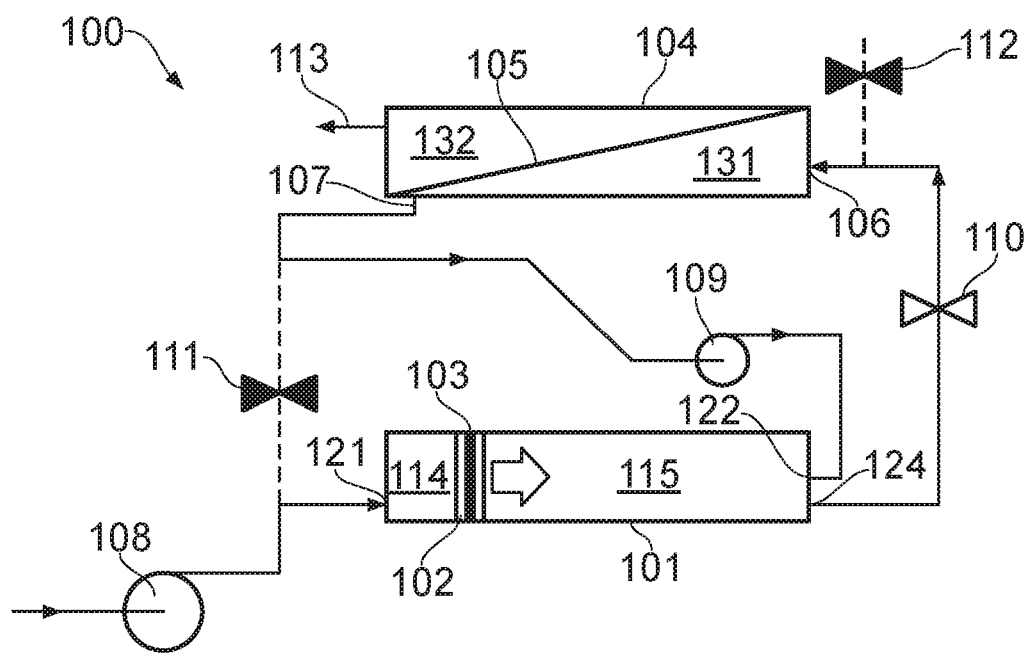
FIG. 2 is a schematic diagram of the example desalination system in a first stage of operation.
Figure 3:
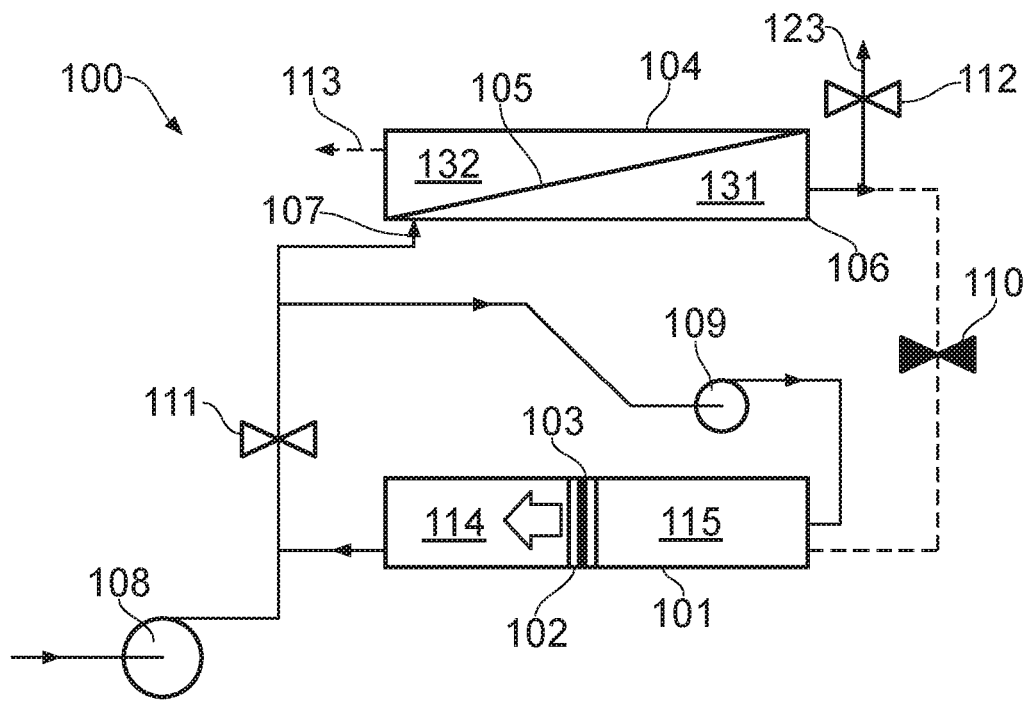
FIG. 3 is a schematic diagram of the example desalination system in a second stage of operation.

FIG. 2 shows specifically the arrangement of the system 100 in the pressurisation stage, during which the feed pump 108 supplies saline water to the upstream compartment 114 on the left side of the piston 102. In this stage, the purge and bypass valves 112, 111 are closed, while the main valve 110 is open. The feed pump 108 causes water in the upstream compartment 114 to become pressurised, such that the action of the pressurised water on the piston 102 causes it to slide to the right, thus displacing saline water held in the downstream compartment 115 and causing the water to flow under pressure into the saline compartment 131 of the membrane vessel 104 via the first cross-flow port 106. To induce the cross-flow in the saline compartment 131, the low-pressure pump 109 withdraws saline water from the saline compartment 131 via the second cross-flow port 107 and returns it to the downstream compartment 115 in a recirculating loop that is switched on by opening of the main valve 110. Recirculation of water at a higher flow rate, for example at a rate several times that of the flow of the feed pump 108, has the advantage of keeping the flow well mixed and uniformly concentrated throughout the loop. This feature of rapid recirculation is important to mitigate high localised concentrations of salt, known as concentration polarisation. Rapid recirculation also mitigates a gradient in concentration along the membrane 105 of the membrane container 104, which would otherwise give rise to a high osmotic pressure at the outlet port 113 and thus a higher required pumping power. In a general aspect therefore, the recharge pump 109 is configured to pump at a flow rate of two or more times that of the feed pump 108, for example at a rate of between two and ten times that of the feed pump 108. The rightward movement of the piston 102 causes the volume inside this loop to diminish gradually, as freshwater permeates the membrane 105 for collection via the permeate outlet port 113, while the concentration of saline water in the loop gradually increases.

Once the piston 102 has moved fully to the right, the saline water reaches a maximum concentration, and needs to be purged from the system. Accordingly the purge-refill, or recharge, stage illustrated in FIG. 3 now begins. The purge is accomplished by opening both the bypass valve 111 and the purge valve 112, thus allowing a volume of water to be supplied by the feed pump 108 to the saline compartment 131 of the partitioned vessel 104 via the second cross-flow port 107 and concentrated saline to exit the system 100 through the purge valve 112 and purge port 123. Simultaneously, the main valve 110 is closed, such that the low-pressure recharge pump 109 no longer induces recirculation through the saline compartment 131 of the membrane container 104. Instead, the flow of saline water from the recharge pump 109 into the downstream compartment 115 causes the piston 102 to move back towards its initial position at the upstream end of the partitioned container 101, i.e fully to the left of the container 101 with reference to FIG. 3. Water thus displaced from the upstream compartment 114 flows to the inlet of the low-pressure pump 109 via the bypass valve 111.

Figure 4:
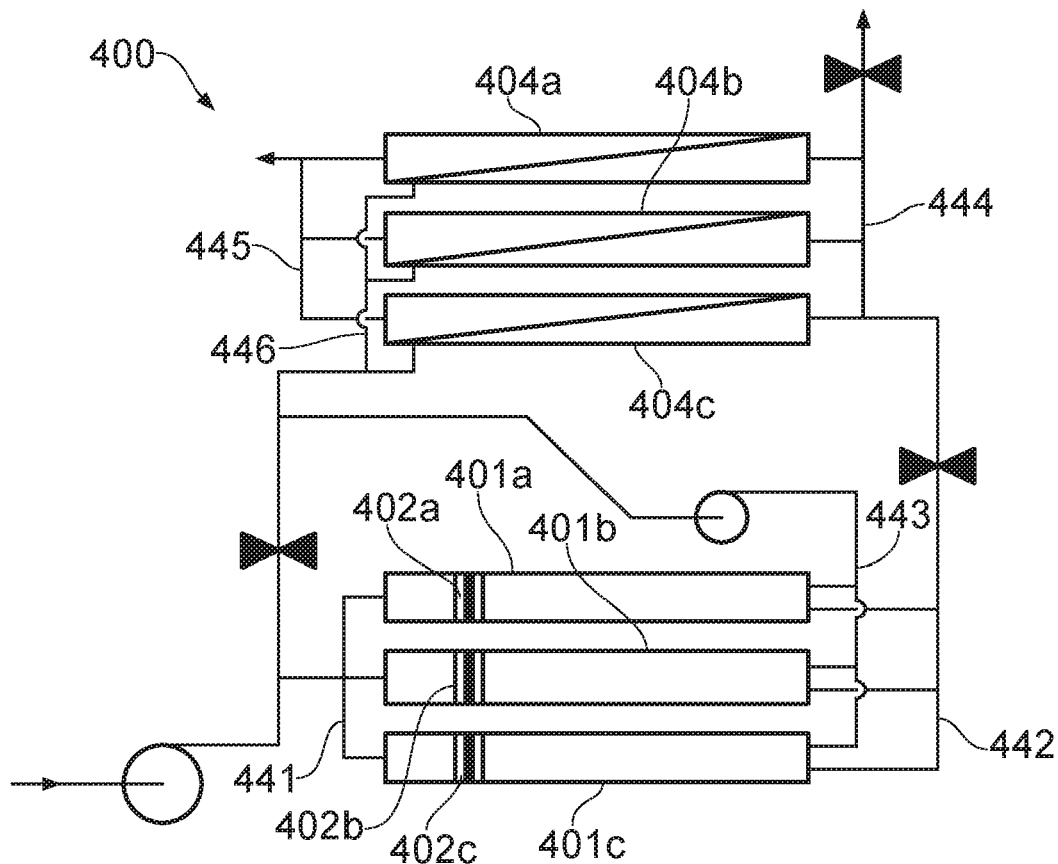
FIG. 4 is a schematic diagram of an alternative example desalination system, in which a plurality of vessels is used for an increased output of desalinated water.

FIG. 4 shows an alternative example comprising a plurality of partitioned containers 401a-c and a plurality of membrane containers 404a-c for increased output of desalinated water. In this example, three identical cylindrical vessels 401a-c house a respective piston 402a-c. A pipe manifold 441 connects the three partitioned containers 401a-c at the left-hand, upstream, ends, providing one interconnected upstream compartment. Similarly, pipe manifolds 442 and 443 connect the partitioned containers 401a-c at the right-hand, downstream, ends to provide one interconnected downstream compartment. The manifolds 441, 442, 443 may be of uniform dimensions, so that water flows evenly among the vessels 401a-c, and the pistons 402a-c move at the same speed, thus reaching the end of each stroke at approximately the same time. The membrane containers 404a-c are similarly connected by pipe manifolds 444, 445, 446. Other features of the desalination system 400 are similar to those of the desalination system 100 as described above, the difference being the use of multiple containers operating in parallel. The method of operation of the desalination system 400 may also be similar to that described above.

It can be appreciated that the number of partitioned vessels 401a-c and membrane vessels 404a-c may be greater than that shown, and the number of each may be the same or different. In practice, a substantially larger number may be arranged to provide an output of desalinated water that increases roughly in proportion to the number of containers used.

In an example method of operation, the pressurisation stage may typically be around 2 minutes or 2.5 minutes in duration, while the purge-refill, or recharge, stage is typically around 20 or 30 seconds in duration. In a general aspect, the pressurisation stage may typically be between around 1 and 5 minutes in duration, while the recharge stage may be between around 15 and 60 seconds in duration. The pressurisation stage may, in other words, take between 1 and 20 times as long as the recharge stage. These durations will vary according to the chosen conditions of use, but generally the pressurisation stage will last several times longer than, for example more than twice as long as, the purge-refill stage and correspondingly the pause in water output during the latter stage is relatively brief. As a result, the use of a normally open valve for the main valve 110 and normally closed valves for the purge and bypass valves 112, 111 will result in a saving in electrical power when operating the desalination system.

Figure 5:
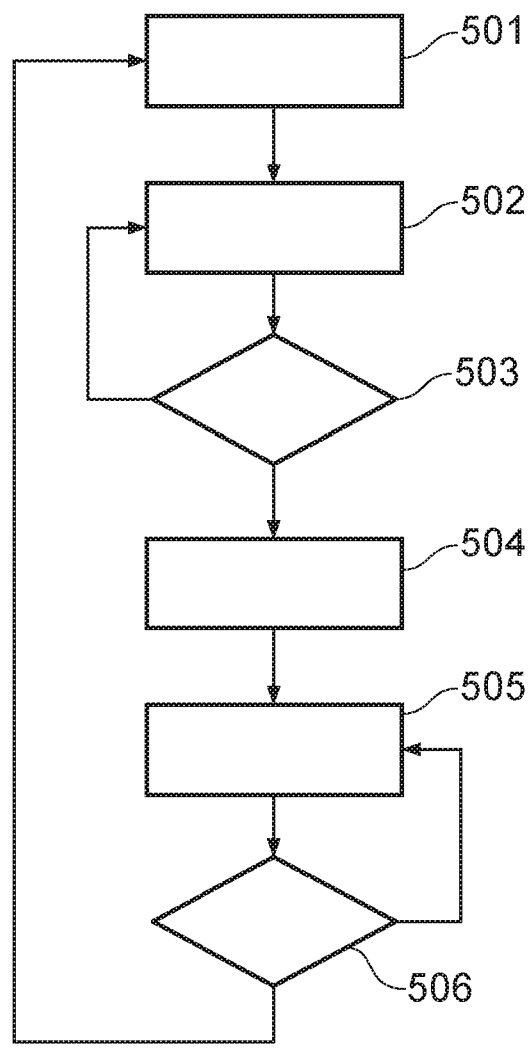
FIG. 5 is a schematic flow diagram illustrating an example method of operating a desalination system.

FIG. 5 illustrates in schematic form an example method of operation for a desalination system of the types described above. In a first step 501, the bypass and purge valves 111, 112 are closed and the main valve 110 opened. In a second step 502, the feed pump 108 and recharge pump 109 are operated to respectively supply saline water to the upstream compartment 114 of the partitioned container 101 and to recirculate saline water through the saline compartment 131 of the membrane container 104. In a third step 503, a check is made as to whether the piston 102 has reached the downstream end of the partitioned container 101 yet. If not, the process continues at step 502. Once the piston 102 has reached the downstream end of the partitioned container 101, the process moves to step 504, where the bypass and purge valves 111, 112 are opened and the main valve 110 is closed. At step 505, the feed pump 108 and recharge pump 109 are operated and at step 506 a check is made as to whether the piston 102 has returned to the upstream end of the partitioned container 101 yet. If not, the process continues at step 505. Once the piston has reached the downstream end of the partitioned container 101, the process returns to step 501 and the process begins again.

Steps 503, 506 may be enabled through the use of sensors, such as sensors 126, 127 as described above, to detect when the piston 102 has reached the downstream and upstream end of the partitioned container 101.

The desalination system 100, 400 as described above comprises three valves: the bypass valve 111, the main valve 110 and the purge valve 112. Each of these valves may be controlled by a controller 125 (FIG. 1), which provides electrical signals to actuate each valve at the appropriate points in the pressurisation and recharge stages. The valves may for example be solenoid valves to allow such electrical operation. However, solenoid and other electrically operated valves have certain drawbacks such as continuous power consumption when actuated. Even though the valves may only be actuated for a relatively short period during the recharge stage, the power consumption at this time may be high, thus increasing the size of the power supply needed. Solenoid valves are also quite expensive and not always reliable, and they may restrict the flow significantly, although an advantage is that they are standard parts and as such readily available.

An alternative to the use of solenoid or other electrically operated valves for the bypass and main valves is to use valves that are instead pressure-actuated. Such valves may therefore be actuated just by the water pressure inside the system, with no electrical power being required to actuate them. Only the purge valve 112 will need to be actuated electrically. The use of pressure-actuated valves has the advantage of reducing the power consumption of the system and simplifying the control circuitry.

As detailed above, the system operates cyclically, alternating between a productive pressurization stage, and a non-productive recharge (i.e. purge-refill) stage. At the beginning of the pressurization stage, the pressure inside the system rises quickly (over a period of a few seconds typically) to reach a pressure of, for example, around 5 bar gauge initially, then gradually increasingly further to reach a higher pressure of about 15 bar gauge typically. The exact values of pressures will depend on the salinity levels and flow rates, but the pressure during the pressurization phase is relatively high and within the range of 5-15 bar approximately. At the start of the recharge stage, when the purge valve 112 opens, the pressure within the system will consequently fall abruptly to a value of less than 1 bar gauge, remaining at a low pressure throughout the rest of this stage. This substantial swing in pressure means that is possible to use spring-loaded pressure-actuated valves that respond to the difference between internal pressure and external atmospheric pressure (i.e. the gauge pressure). The gauge pressure may be used to move plungers that are spring-loaded and have a sealing surface that can either block or allow flow through the valve, according to the position of the plunger. Such pressure-actuated valves are not conventional spring-loaded valves that respond to a difference in pressure between their inlet and the outlet ports. Instead, the important pressure difference is between the inside of the valve and the external atmosphere, which reaches substantial levels. The pressure difference between the inlet and outlet ports will tend to remain small, typically less than 0.5 bar.

Figure 6:
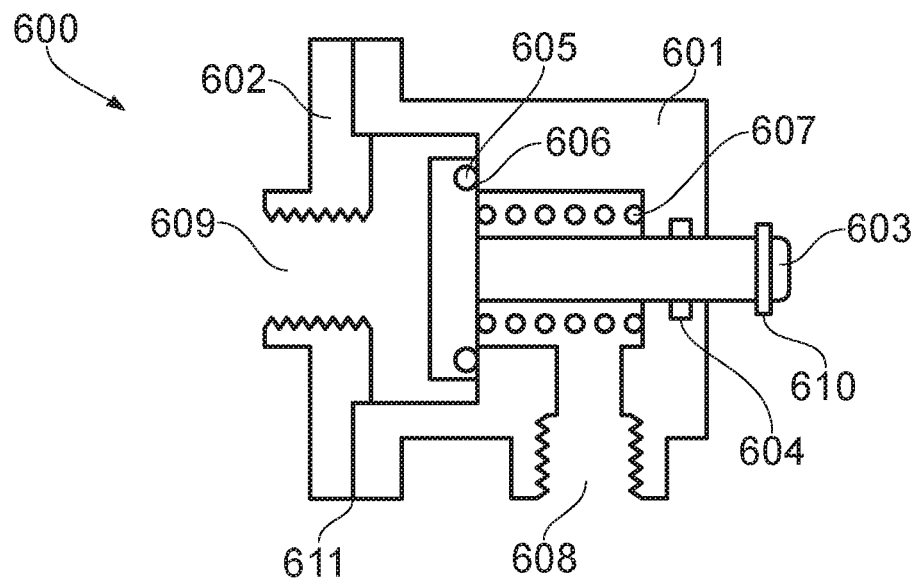
FIG. 6 is a schematic sectional drawing of an example pressure-actuated valve in a closed position.
Figure 7:
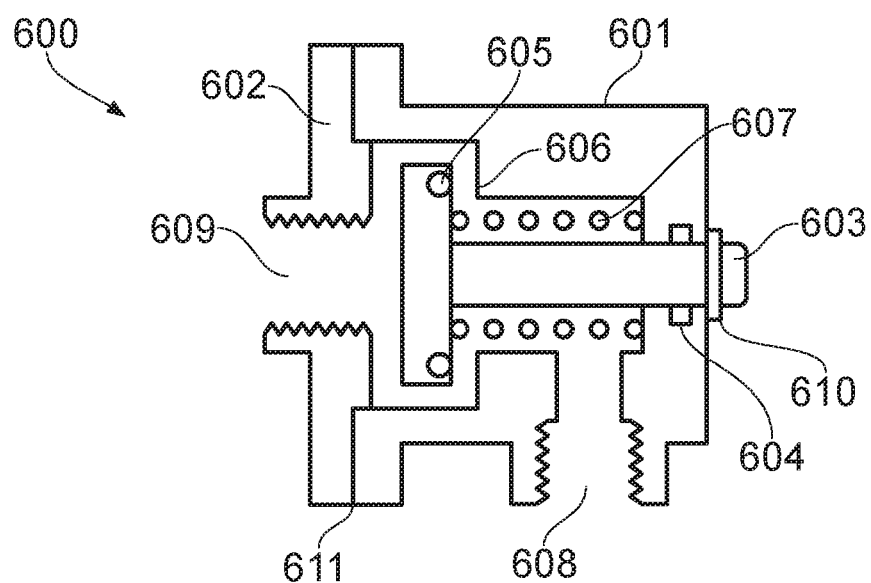
FIG. 7 is a schematic sectional drawing of the valve of FIG. 6 in an open position.

In the case of the bypass valve 111, this valve needs to close when the pressure inside the system is high i.e. during the pressurization stage. An example design of valve to achieve this is shown in FIGS. 6 and 7. The valve 600 comprises a housing 611 having a body 601 and a flange 602, which together house a slidably mounted plunger 603.

The shaft of the plunger 603 protrudes externally from the body 601, with a sliding seal 604 between the plunger 603 and the body 601 provided to prevent water from leaking out. An internal end of the plunger 603 comprises a sealing surface 605, which may be sealed against a corresponding internal surface 606 of the body 601. A sealing o-ring may be provided on the sealing surface 605 to provide a water-tight seal against the internal surface 606. A biasing element such as a spring 607 biases the sealing surface 605 away from the internal surface 606 such that, when the pressure inside the valve is low, the valve is open to allow fluid to flow between the inlet 608 and the outlet 609 of the valve 600. This open position is shown in FIG. 7. An increase in pressure inside the valve 600 causes the plunger 603 to slide so that the sealing surface 605 is forced against the internal surface 606, causing flow between the inlet 608 and outlet 609 to stop, as shown in FIG. 6. Once the internal pressure is sufficiently reduced, the biasing element 607 causes the plunger 603 to slide back and open up flow between the inlet 608 and outlet 609. A circlip 610 may be provided on the plunger 603 to limit the travel of the plunger 603. The travel range of the plunger may alternatively or additionally be limited by an end stop within the housing of the valve 600.

In a general aspect therefore, the valve 600 comprises:
a housing 611 having an inlet 608 and an outlet 609;
a plunger 603 slidably mounted to the housing 611 and having a sealing surface 605 arranged to seal against an internal surface 606 of the housing 611 to prevent flow between the inlet 608 and outlet 609; and
a biasing element 607 arranged to bias the sealing surface 605 away from the internal surface 606 of the housing 611 to maintain a flow path between the inlet 608 and outlet 609 when a pressure within the valve 600 is less than a threshold pressure level and to close the flow path when a pressure within the valve 600 is greater than the threshold pressure level.

The threshold pressure level may be set to be greater than an external pressure, i.e. atmospheric pressure, by a preset amount, for example 1 bar. The valve may therefore remain open as long as the pressure within the valve is less than 1 bar gauge, i.e. nominally 2 bar absolute, and closes when the pressure is above this level.

Figure 8:
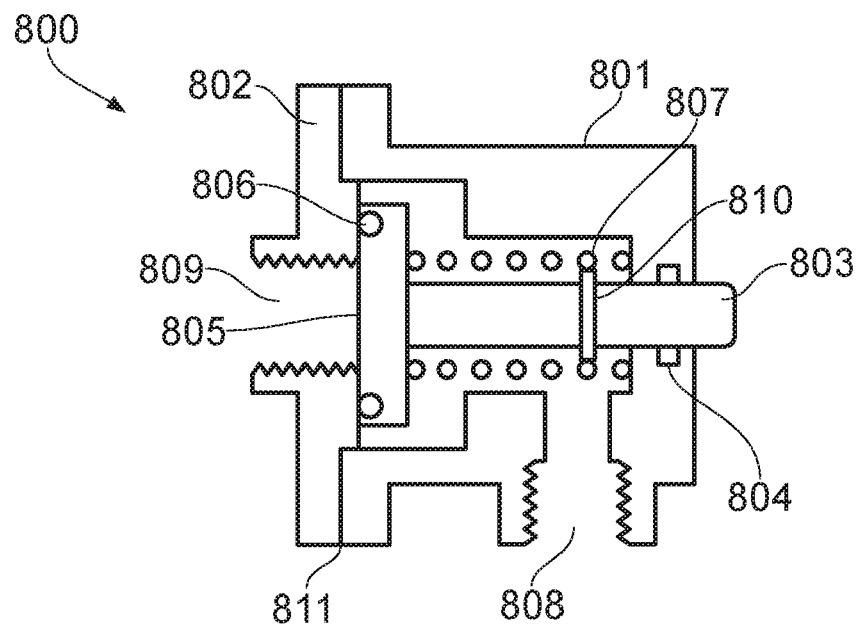
FIG. 8 is a schematic sectional drawing of an alternative example pressure-actuated valve in a closed position.
Figure 9:
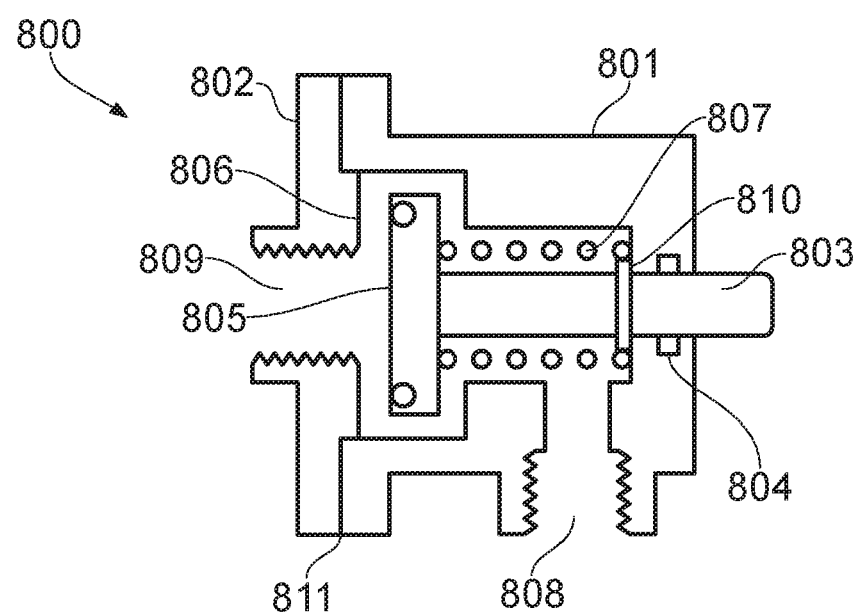
FIG. 9 is a schematic sectional drawing of the valve of FIG. 8 in an open position.

In the case of the main valve 110, an example pressure-actuated valve 800 is illustrated in FIGS. 8 and 9. The construction of the valve 800 is generally similar to that of the valve 600 of FIGS. 6 and 7, with the valve 800 comprising a housing 811 having a body 801 and a flange 802, a plunger 803 being slidably mounted with a sliding seal 804 within the body 801 and having a sealing surface 805 that seals against an internal surface 806 of the housing. In this example, however, the plunger is held normally closed by a biasing element 807 under unpressurised conditions, preventing flow between the inlet 808 and outlet 809. When the gauge pressure rises, the plunger 803 is pushed to the right and the valve 800 is opened, allowing flow between the inlet 808 and outlet 809. This open position is shown in FIG. 9. A circlip 810, or other type of end stop, limits the travel of the plunger to maintain the valve 800 in its open position when under pressure.

In a general aspect therefore, the valve 800 comprises:
a housing 811 having an inlet 808 and an outlet 809;
a plunger 803 slidably mounted to the housing 811 and having a sealing surface 805 arranged to seal against an internal surface 806 of the housing 811 to prevent flow between the inlet 808 and outlet 809; and
a biasing element 807 arranged to bias the sealing surface 605 against the internal surface 806 of the housing 811 to close a flow path between the inlet 808 and outlet 809 when a pressure within the valve 800 is less than a threshold pressure level and to open the flow path when a pressure within the valve 800 is greater than the threshold pressure level.

The threshold pressure level may be set to be greater than an external pressure, i.e. atmospheric pressure, by a preset amount, for example 1 bar. The main valve may therefore remain closed as long as the pressure within the valve is less than 1 bar gauge, i.e. nominally 2 bar absolute, and opens when the pressure exceeds this level.

Valves 600, 800 of the type as described above may be incorporated into the system 100, 400 as the bypass and main valves, with the normally open valve 600 acting at the bypass valve 111, i.e. being closed during the pressurisation stage and open during the recharge stage, and the normally closed valve 800 acting as the main valve 110, i.e. being open during the pressurisation stage and closed during the recharge stage. Pressurisation of the system 100, 400 is therefore controlled by operation of the purge valve 112 and operation of the feed pump 108.

Figure 10:
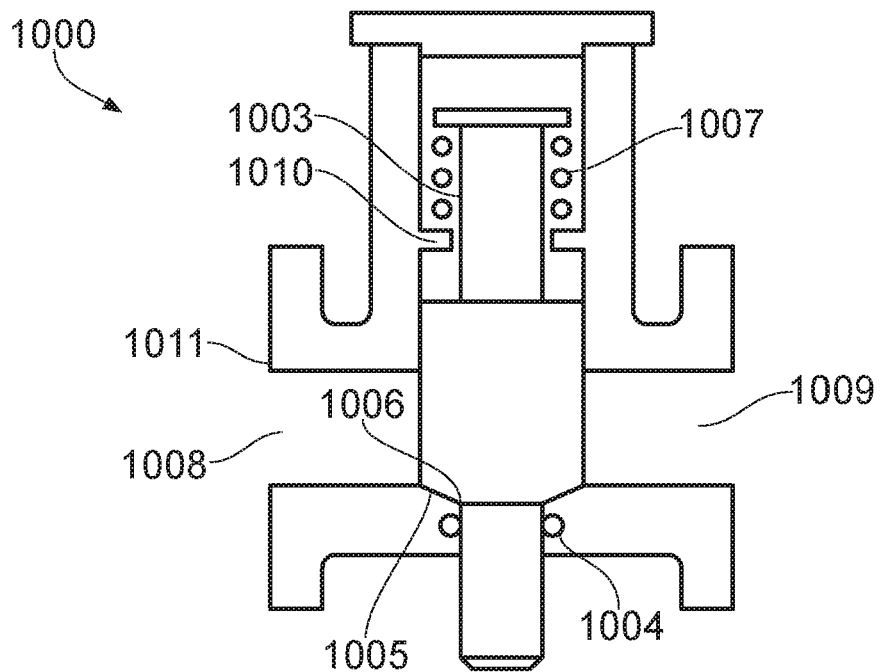
FIG. 10 is a schematic sectional drawing of an alternative example of a valve of the type of FIG. 6 in a closed position.
Figure 11:
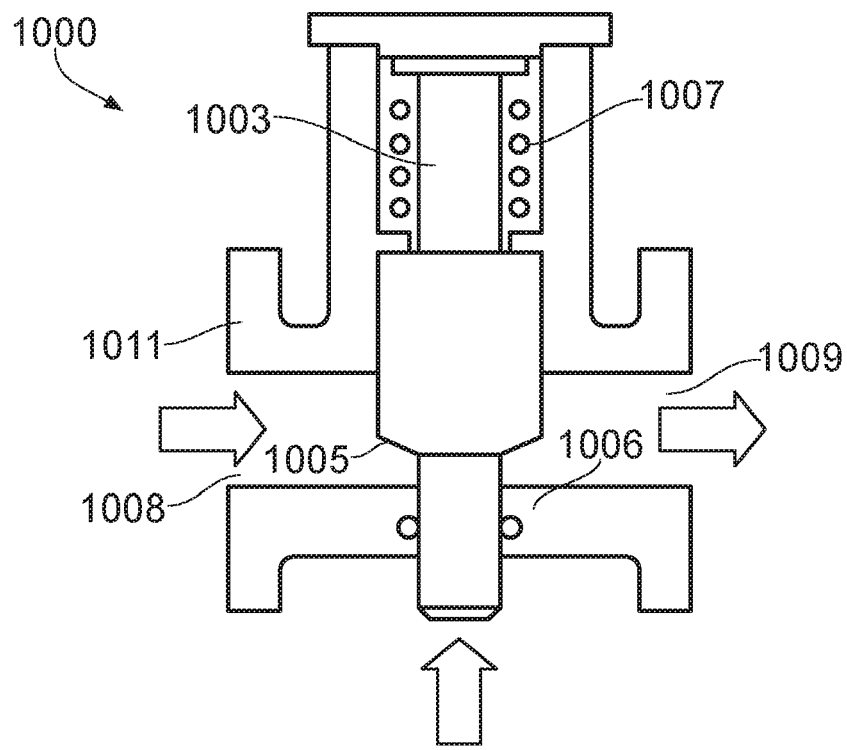
FIG. 11 is a schematic sectional drawing of the valve of FIG. 10 in an open position.

FIGS. 10 and 11 illustrate an alternative example of a valve for use as a bypass valve, the operation of which is similar to that shown in FIGS. 6 and 7. The valve 1000 comprises a housing 1011, which houses a slidably mounted plunger 1003. The shaft of the plunger 1003 protrudes externally from the housing 1011, with a sliding seal 1004 between the plunger 603 and the body 601 is provided to prevent water from leaking out. An internal part of the plunger 1003 comprises a sealing surface 1005, which may be sealed against a corresponding internal surface 1006 of the housing 1011. A sealing o-ring (not shown) may be provided on the sealing surface 1005 to provide a water-tight seal against the internal surface 1006. A biasing element such as a spring 1007 biases the sealing surface 1005 away from the internal surface 1006 such that, when the pressure inside the valve 1000 is low, the valve is open to allow fluid to flow between the inlet 1008 and the outlet 1009 of the valve 1000. This open position is shown in FIG. 11. An increase in pressure inside the valve 1000 causes the plunger 1003 to slide so that the sealing surface 1005 is forced against the internal surface 1006, causing flow between the inlet 1008 and outlet 1009 to stop. Once the internal pressure is sufficiently reduced, the biasing element 1007 causes the plunger 1003 to slide back and open up flow between the inlet 1008 and outlet 1009. An end stop 1010 may be provided to limit the travel of the plunger 1003.

Figure 12:
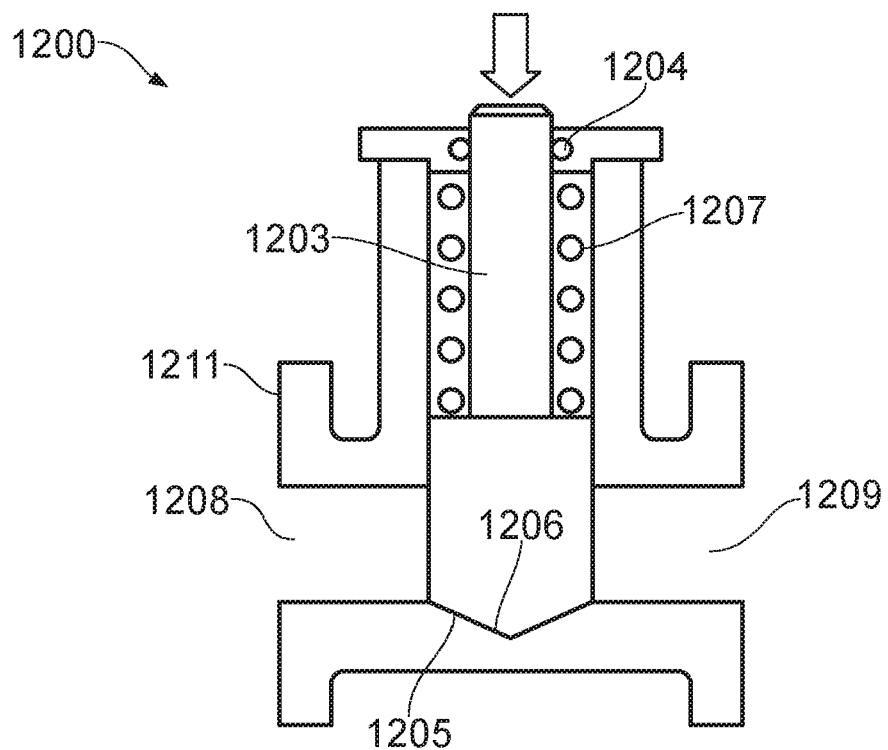
FIG. 12 is a schematic sectional drawing of an alternative example of a valve of the type of FIG. 8 in a closed position.
Figure 13:
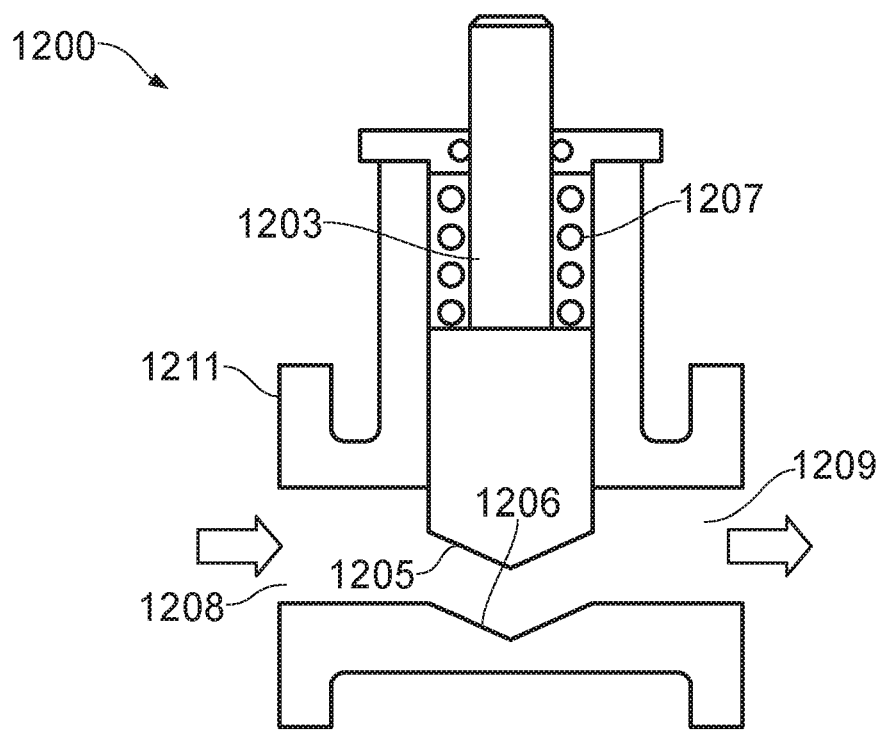
FIG. 13 is a schematic sectional drawing of the valve of FIG. 12 in an open position.

FIGS. 12 and 13 illustrate an alternative example of a valve for use as a main valve, the operation of which is similar to that shown in FIGS. 8 and 9. The construction of the valve 1200 is generally similar to that of the valve 1000 of FIGS. 10 and 11, with the valve 1200 comprising a housing 1211, a plunger 1203 being slidably mounted with a sliding seal 1204 within the housing and having a sealing surface 1205 that seals against an internal surface 1206 of the housing 1211. In this example, however, the plunger 1203 is held normally closed by a biasing element 1207 under unpressurised conditions, preventing flow between the inlet 1208 and outlet 1209. When the gauge pressure rises, the plunger 1203 is pushed upwards and the valve 1200 is opened, allowing flow between the inlet 1208 and outlet 1209. This open position is shown in FIG. 13. An end stop may be provided to limit the travel of the plunger 1203 to maintain the valve 1200 in its open position when under pressure.

Other embodiments are intentionally within the scope of the invention as defined by the appended claims.

The invention claimed is:

1. A desalination system comprising:
a partitioned container housing a movable partition partitioning the container into an upstream compartment and a downstream compartment each of variable volume, the partitioned container having a first inlet port at an upstream end of the container, a second inlet port at a downstream end of the container and an outlet port at the downstream end of the container;
a membrane container housing a cross-flow semipermeable membrane dividing the membrane container into a saline compartment and a desalinated compartment, the saline compartment comprising first and second cross-flow ports, the desalinated compartment comprising a desalinated water outlet port;
a feed pump connected to feed a supply of saline water to the first inlet port;
a recharge pump having an inlet connected to the second cross-flow port and an outlet connected to the second inlet port to feed saline water into the downstream compartment;
a main valve connected between the outlet port and the first cross-flow port;
a bypass valve connected on one side to the inlet port and on another side to the second cross-flow port and the inlet of the recharge pump;
a purge valve connected on one side to the first cross-flow port and the main valve and on another side to a purge port; and
a controller connected and configured to operate the desalination system, the controller configured to:
in a first pressurisation stage, close the bypass valve and purge valve, open the main valve and operate the feed pump to provide a supply of saline water to the upstream compartment of the partitioned container, causing the partition to move and thereby flowing saline water from the downstream compartment into the saline compartment of the membrane container, thereby causing desalinated water to exit from the desalinated compartment of the membrane container via the desalinated water outlet port; and
in a second recharge stage, open the bypass valve and purge valve, close the main valve and operate the recharge pump and feed pump to feed saline water to the second inlet of the partitioned container and into the saline compartment of the membrane container via the second cross-flow port to cause saline water to flow out through the purge port via the first cross-flow port.

2. The desalination system of claim 1, wherein, in the first pressurisation stage, the controller is configured to operate the recharge pump to feed saline water from the saline compartment to the second inlet of the partitioned container.

3. The desalination system of claim 1, wherein the controller is configured to repeat the pressurisation and recharge stages.

4. The desalination system of claim 1 comprising a first sensor arranged to provide a signal to detect when the moveable partition has, in the recharge stage, reached the upstream end of the partitioned container, the controller configured to end the recharge stage upon detecting the signal from the first sensor.

5. The desalination system of claim 1 comprising a sensor arranged to provide a signal to detect when the moveable partition has, in the pressurisation stage, reached the downstream end of the partitioned container, the controller configured to end the pressurisation stage upon detecting the signal from the second sensor.

6. The desalination system of claim 1, wherein the partitioned container is a cylindrical vessel and the moveable partition is a piston slidably mounted within the cylindrical vessel.

7. The desalination system of claim 1, wherein the membrane container is a cylindrical vessel.

8. The desalination system of claim 1, comprising:
one or more further partitioned containers, each housing a movable partition partitioning the container into an upstream compartment and a downstream compartment each of variable volume, each further partitioned container having a first inlet port at an upstream end of the container, a second inlet port at a downstream end of the container and an outlet port at the downstream end of the container;
one or more further membrane containers, each housing a cross-flow semipermeable membrane dividing the membrane container into a saline compartment and a desalinated water compartment, the saline compartment comprising first and second cross-flow ports, the desalinated water compartment comprising a desalinated water outlet port,
wherein the feed pump is connected to feed the supply of saline water to the first inlet port of each partitioned container, the recharge pump is connected between the second cross-flow port of each membrane container and the second inlet port of each partitioned container to feed saline water into the downstream compartment of each container, the main valve is connected between the outlet port of each partitioned container and the first cross-flow port of each membrane container, the bypass valve is connected on the one side to the inlet port of each partitioned container and on the other side to the second cross-flow port of each membrane container, and the purge valve is connected on the one side to the first cross-flow port of each membrane container.

9. The desalination system of claim 1 in which the semipermeable membrane is of reverse osmosis type.

10. The desalination system of claim 1, wherein the controller is configured to control operation of the main valve, the bypass valve and the purge valve electrically.

11. The desalination system of claim 1, wherein the controller is configured to control operation of the purge valve electrically and wherein the main valve and bypass valve are actuated between an open position and a closed position by a level of water pressure within the system.

12. The desalination system of claim 11, wherein the main valve is configured to open when the level of water pressure within the system is above a threshold pressure level and the bypass valve is configured to open when the level of water pressure is below the threshold pressure level.

13. The desalination system of claim 12 wherein the main valve comprises:
a housing having an inlet and an outlet;
a plunger slidably mounted to the housing and having a sealing surface arranged to seal against an internal surface of the housing to prevent flow between the inlet and outlet; and
a biasing element arranged to bias the sealing surface away from the internal surface of the housing to maintain a flow path between the inlet and outlet when the level of water pressure within the main valve is less than the threshold pressure level and to close the flow path when the level of water pressure within the main valve is greater than the threshold pressure level.

14. The desalination system of claim 12 wherein the bypass valve comprises:

a housing having an inlet and an outlet;

a plunger slidably mounted to the housing and having a sealing surface arranged to seal against an internal surface of the housing to prevent flow between the inlet and outlet; and a biasing element arranged to bias the sealing surface against the internal surface of the housing to close a flow path between the inlet and outlet when the level of water pressure within the bypass valve is less than the threshold pressure level and to open the flow path when the level of water pressure within the bypass valve is greater than the threshold pressure level.

15. The desalination system of claim 12 wherein the threshold pressure level is around 1 bar gauge.

16. A method of operating a desalination system, the desalination system comprising:

a partitioned container housing a movable partition partitioning the container into an upstream compartment and a downstream compartment each of variable volume, the partitioned container having a first inlet port at an upstream end of the container, a second inlet port at a downstream end of the container and an outlet port at the downstream end of the container;

a membrane container housing a cross-flow semipermeable membrane dividing the membrane container into a saline compartment and a desalinated water compartment, the saline compartment comprising first and second cross-flow ports, the desalinated water compartment comprising a desalinated water outlet port;

a feed pump connected to feed a supply of saline water to the first inlet port;

a recharge pump connected between the second cross-flow port and the second inlet port to feed saline water into the downstream compartment;

a main valve connected between the outlet port and the first cross-flow port;

a bypass valve connected on one side to the first inlet port and on another side to the second cross-flow port and the recharge pump; and a purge valve connected on one side to the first cross-flow port and the main valve and on another side to a purge port, the method comprising:

in a first pressurisation stage, closing the bypass valve and purge valve, opening the main valve and operating the feed pump to provide a supply of saline water to the upstream compartment of the partitioned container, causing the partition to move and thereby flowing saline water from the downstream compartment into the saline compartment of the membrane container, thereby causing desalinated water to exit from the desalinated water compartment of the membrane container via the desalinated water outlet port; and in a second recharge stage, opening the bypass valve and purge valve, closing the main valve and operating the recharge pump and feed pump to feed saline water to the second inlet of the partitioned container, into the saline compartment of the membrane container via the second cross-flow port and out through the purge port via the first cross-flow port.

17. The method of claim 16 wherein the first pressurisation stage comprises operating the recharge pump to feed saline water from the saline compartment to the second inlet of the partitioned container.

18. The method of claim 16 comprising repeating the pressurisation and recharge stages.

19. The method of claim 16 comprising detecting a signal from a first sensor when the moveable partition has, in the recharge stage, reached the upstream end of the partitioned container, and ending the recharge stage upon detecting the signal from the first sensor.

20. The method of claim 16 comprising detecting a signal from a second sensor when the moveable partition has, in the pressurisation stage, reached the downstream end of the partitioned container, and ending the pressurisation stage upon detecting the signal from the second sensor.

* * * * *